Patented Sept. 27, 1932

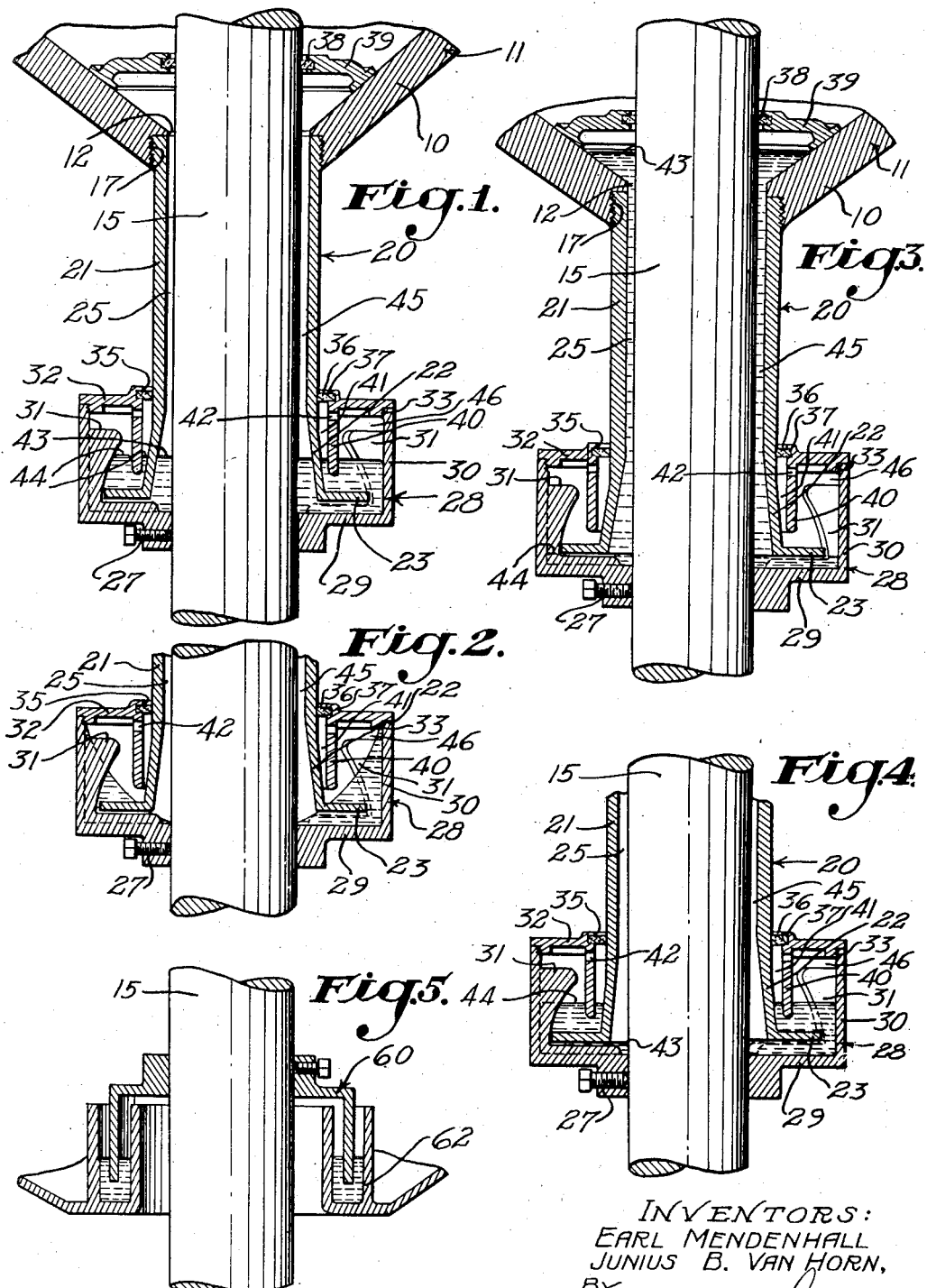

1,879,626

UNITED STATES PATENT OFFICE

EARL MENDENHALL AND JUNIUS B. VAN HORN, OF LOS ANGELES, CALIFORNIA

EMULSION-PREVENTING SEAL

Application filed October 10, 1927. Serial No. 225,182.

Our invention relates to fluid seals, and more particularly to a device for forming an emulsion-preventing seal.

It is often desirable to pass a rotating shaft through some form of shell, and to seal the junction where the shaft passes from the shell so that no fluid will pass into or from the shell around the shaft. Such a condition is met when operating an oil filled bearing or a motor below the surface of a fluid which might be injurious to the working parts of the bearing or motor should it enter therein. The usual method of forming such a seal is through the medium of a conventional stuffing box arrangement. We have found that a stuffing box, having any form of solid or semi-solid packing, is not effective in entirely preventing the external fluid from reaching the interior of the shell. With such an arrangement, the external and the internal fluids contact and tend to emulsify at the surface of the shaft.

It is an object of our invention to effectively seal the junction between a rotatable member and a stationary member, so that no emulsification or other mixing action takes place.

A further object of our invention is to form a seal between two mediums to prevent said mediums from contacting each other.

We have found that a fluid-packed seal is effective to prevent any emulsification or intermixture of the internal and external fluids. Such a seal is extremely valuable where the internal and external pressures are approximately equal, and our invention may be used in conjunction with devices for thus equalizing these pressures. In other installations, such pressure equalizing means are not necessary and, in fact, undesirable.

It is an object of our invention to provide an emulsion-preventing seal which in itself tends to eliminate differences in pressure between the fluids which it seals apart.

Another object of our invention is to provide an emulsion-preventing seal between a stationary and a rotatable member, which will allow an easy passage of fluid in one direction but will greatly impede any flow of fluid in an opposite direction.

Another object of our invention is to provide an emulsion-preventing seal of the fluid-packed type in which no sealing fluid can escape therefrom.

Another object of our invention is to provide a fluid-packed, emulsion-preventing seal, wherein the sealing fluid rotates with a rotatable member of the seal.

Further objects and advantages of our invention will be made evident hereinafter.

Two forms of the invention are shown in the accompanying drawing.

Fig. 1 illustrates in section the preferred form of our invention when the shaft is stationary and the pressure is equalized.

Fig. 2 illustrates in section the position of the parts of the emulsion-preventing seal when the shaft is rotating.

Fig. 3 illustrates the differential release feature of our invention when the external pressure is greater than the internal pressure.

Fig. 4 illustrates the differential release feature of our invention when the internal pressure is greater than the external pressure.

Fig. 5 illustrates an alternative form of our invention.

Referring particularly to Fig. 1, we show a conical bottom 10 of a shell 11. Passing through an opening 12 in the bottom 10 is a shaft 15 which may be suitably journaled in the shell 11. Screwed into a countersunk portion 17 of the opening 12, is an apron 20 which surrounds the shaft 15 and is concentric therewith. The apron 20 comprises a cylindrical portion 21, having a diverging base 22 which has a radial plate 23 on the lower end thereof. There is a clearance space 25 between the cylindrical portion 21 and the shaft 15, for a purpose to be described.

Attached to the shaft 15 by a set screw 27 is a cup 28 of our invention. The cup 28 has a radial portion 29 at the outer end of which is a cylindrical wall 30. This cylindrical wall is concentric with the axis of the shaft 15 and is adapted to extend a distance above the radial plate 23, as shown in the drawing. Webs 31 are spaced around the periphery of the wall 30 and extend inward therefrom in the shape shown in the drawing, these webs defining pockets in which the mercury rotates at the same speed as the wall 30 so that no slippage between the mercury and the wall takes place. A suitable cover 32 is screwed into the cylindrical wall 30, as indicated at 33. The cylindrical portion 21 of the apron 20 extends through an opening 35 in the cover 32, there being a clearance space 36 therebetween. Suitably mounted in this opening 35 and extending across the clearance space 36 to engage the shaft 15 is a fluid-impeding washer 37 made of felt or similar porous material. A similar fluid-impeding washer 38 is mounted in the conical bottom 10 in an annular bracket 39 surrounding the shaft 15, and is adapted to engage the shaft as shown in Figs. 1 and 3.

Extending downward from the cover 32, and concentric with the apron 20 is a baffle 40. The lower end of this baffle lies below the mid-point of the cylindrical wall 30 but does not engage the diverging base 22 of the apron, there being a clearance space 41 therebetween. Openings 42 communicate between the space 41 and the upper interior of the cup 28.

Before the cover 32 is screwed in place, mercury, or other high density sealing fluid, is poured into the cup 28 until the cup is substantially half filled and the lower edge of the baffle 40 is submerged, as shown in Fig. 1. In this figure the surface level of the mercury in the clearance space 25 is indicated by the numeral 43, and the level of the mercury surrounding the apron 20 is indicated by the numeral 44. It should be noted that the surface 43 is in communication with the interior of the shell 11 through the clearance space 25. This clearance space, together with that portion of the conical bottom 10 below the bracket 39, forms an internal storage chamber 45. The surface 44 of the mercury is in communication with any external fluid surrounding the seal through the clearance space 36, the washer 37 being adapted to slowly pass such a fluid. That portion of the cup 28 bounded by the surface 44, the cylindrical shell 30, the top 32, and the diverging base 22 forms an external storage chamber 46, for a purpose to be described.

Fig. 1 indicates the position of the mercury levels when the pressure of any fluid inside the shell 11 is equal to the pressure of any fluid outside of the shell 11 and the shaft 15 is not rotating. It will be noticed that the surfaces 43 and 44 are in line with each other. When the shaft 15 is rotated, the webs cause the mercury to rotate therewith. Fig. 2 shows the approximate position of the mercury when the shaft 15 is rotating and when the pressures inside and outside the shell 11 are equal. The surfaces of the mercury lie in the shape of a paraboloid during the rotation of the shaft due to the centrifugal force on the mercury as it is rotated. It should be noted that the outer edge of the radial plate 23 is at all times beneath the surface of the mercury so that no fluid can escape therearound without displacing the mercury.

The seal of our invention provides a differential pressure release due to the fact that the clearance space 25 is relatively small in cross section in comparison with the horizontal cross section of the external storage chamber 46. Also, the cylindrical portion 21 of the apron 20 is relatively long in comparison with the height of the cylindrical wall 30 of the cup 28. Should the external pressure acting upon the surface 44 become greater than the internal pressure acting upon the surface 43, this surface 43 will tend to rise in the clearance space 25. The surface 44 will correspondingly lower, but this lowering will be relatively small in comparison with the rise of the surface 43, due to the difference in cross sectional area of the external storage chamber 46 and the clearance space 25. Should this external pressure increase to such a point that the surface 44 would be lowered into the position shown in Fig. 3, fluid from the exterior will bubble through the mercury and rise in the clearance space 25. It should be noted, however, that the difference in level between the surface 44 and the surface 43 is very great in this regard, and a great difference in pressure is necessary to allow any external fluid to enter the interior of the shell 11. If the shell 11 is substantially tight, a small amount of fluid will pass upward through the clearance space 25 at this time and will relieve the difference of pressures so that the surface 43 will again drop.

If, however, the internal pressure in the shell 11 becomes greater than the external pressure, the surface 43 is lowered and the surface 44 is slightly raised. This rise in the surface 44 is compartively small relative to the lowering of the surface 43. If the surface 43 lowers into the position shown in Fig. 4, fluid from the interior of the shell 11 will bubble through the mercury and escape into the external storage chamber 46. In comparing Figs. 3 and 4, it should be clear that the difference in pressure between the interior and exterior when an escape of fluid occurs will be much smaller in the latter case than in the former. This is a very desirable feature on certain installations where it would not be desirable to have external fluid enter the shell 11 but where it would be desirable to have any excess of internal pressure easily relieved by allowing the fluid inside the shell 11 to escape through the emulsion-preventing seal. Such a differential pressure release device is operative irrespective of the rotation of the shaft 15.

By repeated experiments, we have found that it is necessary to cause the mercury to be rotated with the shaft if all emulsification is to be prevented at high shaft speeds. When rotating, the mercury is subject to a very high centrifugal force and emulsification between the mercury and the fluid inside or outside the shell is prevented. In combination with slowly rotating shafts, it is possible to have the mercury stationary and allow the apron to revolve. Such an arrangement is shown in Fig. 5 where an apron 60 is secured to the shaft 15, the lower edge of the apron 60 extending below the surface level of mercury in a stationary cup 62, formed in the bottom of the shell. The stationary cup 62 is annular in shape and is concentric with the axis of the shaft 15. On slowly rotating shafts, such a seal prevents any emulsification between the mercury and the internal or external fluid. Increasing the speed of rotation, however, causes a marked tendency for these fluids to emulsify with the mercury, and it is for this reason that we prefer to rotate the mercury with the shaft, as illustrated in the preferred form of our invention. When rotating the mercury, we have found no difficulty in stopping the emulsification between the mercury and either the internal or external fluid.

The fluid-impeding washers 37 and 38 serve several purposes. Primarily they are used as a means for retarding a quick passage of fluid therethrough and act as a dashpot mechanism to retard any quick flows of fluid due to quick changes of pressure, but allow fluid to slowly seep therethrough. A second purpose is to hold the mercury in the seal even though the seal is inverted. To accomplish this latter purpose they are formed of a material which will pass low density fluids but retain high density fluids such as mercury. Still a third purpose is to prevent any dirt from reaching the mercury.

It should thus be noted that there is no possibility of the mercury in the cup 28 escaping, even though the emulsion-preventing seal should be upturned. The cover 32 prevents any of the mercury from flying out of the top of the cup 28, and the clearance space and the conical bottom 10, shape of the together with the annular bracket and washer 38, preclude any escape into the upper interior of the shell 11, the surfaces 43 and 44 always retaining the position shown in Fig. 1 when the pressures are equalized and the shaft stationary. The internal and external storage chambers 45 and 46 are spacious enough to allow the mercury to be displaced therein without losing any of it.

The diverging base 22 on the apron 20 is important to the invention. We have found that if the apron 20 is to be made cylindrical over its entire length, there is a marked tendency for any emulsification which might be formed between the mercury and the internal fluid to be carried upward through the space 25 and eventually to intermix with the internal fluid in the shell 11. By diverging the lower end of the apron this is eliminated. In explaining this action it must be remembered that emulsification would only tend to take place when the shaft is rotating, and that should any emulsification take place there would be a large centrifugal force acting on the emulsified fluid adjacent to the surface 43 of the mercury. This centrifugal force is directly radially outward but when pressing against the diverging base 22 is divided into two components, one acting perpendicular to the diverging base at any point and the other acting directly downward from that point. This downward force prevents the rise of the emulsified fluid in the space 25.

The baffle 40 and the webs 31 also are valuable to the invention, although their use is not essential to the functioning of our device. The advantage of using a baffle is that there will never be any relative motion between the fluid in that portion of the external storage chamber 46 which surrounds the baffle and the mercury surface 44 inasmuch as the fluid is bounded by the mercury and the baffle, both of which are rotating. If the baffle were not present, this fluid would be bounded on one side by the rotating mercury and on the other by the stationary apron which would cause agitation of the fluid and which would have a tendency to cause emulsification with the mercury.

It is within the scope of our invention to design the alternative form of our invention shown in Fig. 5 so that it too will have a differential pressure release feature. This could be done by properly proportioning the cross sectional areas of the annular channel of the cup 62 and the apron 60. Suitable receptacles might also be provided in the walls of the cup 62 to provide suitable storage chambers for the mercury when fluid is escaping around the lower edge of the apron 60 in either direction. The webs and fluid-impeding washers might also be adapted to this form of the invention without departing from the spirit of our invention.

The type of seal herein disclosed is also disclosed but not specifically claimed in our copending application entitled "Submersible Electric Motor", filed June 8, 1926, Serial No. 114,414, of which this application is a continuation-in-part.

We claim as our invention:

1. In an emulsion-preventing seal, the combination of: a rotatable cup containing a sealing fluid; a stationary member extending below the surface of said sealing fluid; and a baffle extending into said cup and surrounding said stationary member.

2. In an emulsion-preventing seal, the combination of: a rotatable cup containing a sealing fluid; a stationary member extending below the surface of said sealing fluid; a cover on said cup; and a baffle on said cover, said baffle extending into said cup and surrounding said stationary member.

3. In an emulsion-preventing seal, the combination of: a rotatable cup containing mercury; webs extending into said cup; a stationary member extending below the surface of said mercury; and a baffle extending into said cup and surrounding said stationary member.

4. In an emulsion-preventing seal, the combination of: a rotatable cup containing mercury; a stationary member extending below the surface of said mercury; a cover on said cup, said cover surrounding said stationary member; means between said cover and said stationary member for retarding a flow of fluid therebetween; and a baffle on said cover, said baffle extending into said cup and surrounding said stationary member.

5. In an emulsion-preventing seal, the combination of: a rotating cup containing a sealing fluid; a stationary apron extending below the surface of said sealing fluid in a manner to form separated surfaces respectively contacting bodies of internal and external fluids; and fluid-impeding means permitting slow movements of said internal and external fluids therethrough, but preventing any passage of said sealing fluid.

6. A combination as defined in claim 2 in which a clearance space is formed between said baffle and said stationary member, said clearance space being in communication with the space inside said cup above said sealing fluid.

7. In an emulsion-preventing seal, the combination of: walls forming an internal storage chamber; walls forming an external storage chamber, there being a body of sealing liquid for sealing said chambers one from the other; and a fluid-retarding packing extending across each of said chambers and through which packing the fluid having access to said body of sealing liquid must pass.

8. In an emulsion-preventing seal for a rotating shaft, the combination of: a cup secured to said shaft and retaining a body of sealing medium; and an apron surrounding said shaft and defining an annular chamber therearound in communication with an internal fluid, said apron including a diverging base and a radial plate extending outward from the lower end of said diverging base at a section below the surface of said sealing medium.

9. In an emulsion-preventing seal for sealing a rotatable element relative to a stationary element, the combination of: walls attached to one of said elements and forming an internal storage chamber; walls attached to the other of said elements and forming an external storage chamber, there being a body of sealing fluid in said chambers and adapted to flow from one chamber to another in response to pressure differences existing in said chambers; and means extending between said stationary and rotatable elements and preventing a quick passage of said fluid from one chamber to another under quick changes of pressure in said chambers.

10. A combination as defined in claim 9 in which said means comprises a porous member bridging the space between said rotatable and stationary members, and through which any fluid entering one of said chambers must flow.

11. In an emulsion-preventing seal, the combination of: a rotating element including a cup containing a body of sealing fluid; and a stationary element extending into said cup and providing a downwardly diverging surface extending below the surface of said sealing fluid, said surface cooperating with said rotatable element in defining a clearance space in which said sealing fluid contacts a body of the fluid to be sealed.

12. In an emulsion-preventing seal for sealing the junction of a vertical rotatable member and a stationary member and contacting a primary and a secondary fluid, the combination of: walls forming a vertically extending primary storage chamber in communication with said primary fluid; walls forming a vertically extending secondary storage chamber in communication with said secondary fluid, said secondary storage chamber being of greater cross-sectional area in a horizontal plane than said primary storage chamber; and a body of a sealing fluid separating said chambers but being displaceable thereinto to allow intermixture of said primary and secondary fluids upon the existence of a pressure differential between said chambers, the pressure differential to displace said sealing fluid into said primary chamber being greater than that required to displace said sealing fluid into said secondary chamber due to said primary chamber forming said body of sealing fluid into a high column and said secondary chamber forming said body of sealing fluid into a lower column, whereby the pressure differential required to allow secondary fluid to pass into said primary fluid is greater than the pressure differential required to allow primary fluid to pass into said secondary fluid.

13. In an emulsion-preventing seal the combination of: a rotatable shaft; a cup containing a body of sealing fluid; a stationary apron surrounding said shaft and extending below the surface of said sealing liquid; and a baffle rotating with and concentric with said shaft and extending in close relationship with said apron whereby the fluid on one side of said baffle and in the space between said baffle and said apron is bounded by surfaces which are moving relative to each other, and the fluid on the other side of said baffle is bounded by surfaces which are not moving relative to each other.

In testimony whereof, we have hereunto set our hands at Los Angeles, California, this 4th day of October, 1927.

EARL MENDENHALL.
JUNIUS B. VAN HORN.